No. 638,743. Patented Dec. 12, 1899.
F. A. McLELLAN.
GRAIN SCOURER.
(Application filed Apr. 21, 1899.)
(No Model.)
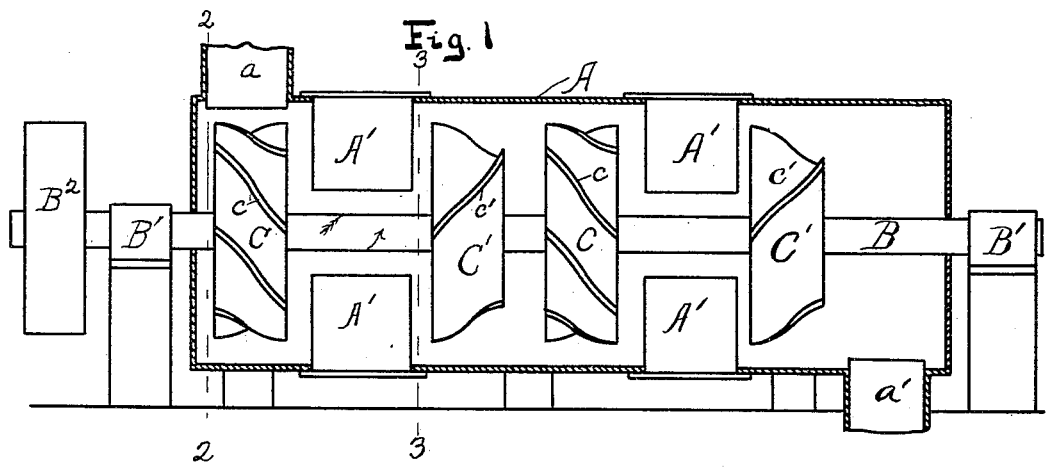
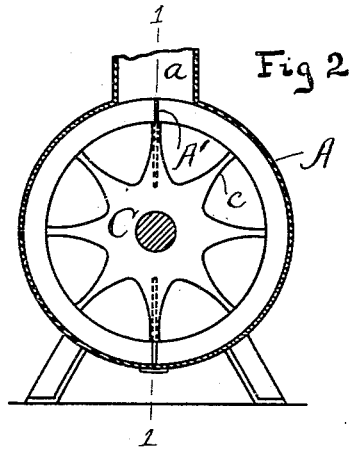
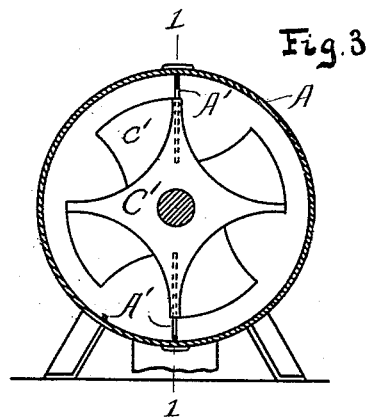
Witnesses
John Walton
M. Rury
Inventor
By Frederick A. McLellan
Attorney

UNITED STATES PATENT OFFICE.

FREDERICK A. McLELLAN, OF FORT WORTH, TEXAS.

GRAIN-SCOURER.

SPECIFICATION forming part of Letters Patent No. 638,743, dated December 12, 1899.

Application filed April 21, 1899. Serial No. 713,848. (No model.)

*To all whom it may concern:*

Be it known that I, FREDERICK A. McLELLAN, a citizen of the United States, residing at Fort Worth, in the county of Tarrant and State of Texas, have invented certain new and useful Improvements in Grain-Scourers; and I do hereby declare the following to be a full, clear, and exact description of the invention, such as will enable others skilled in the art to which it appertains to make and use the same.

This invention relates to grain-scourers; and it consists in certain improvements in the construction thereof, as will be hereinafter fully described, and pointed out in the claims.

The object of the invention is to produce a machine which is durable and compact and which will thoroughly scour or clean the kernels of grain passing through the machine by the action of the parts of the machine upon the kernels of grain and the action of the kernels of grain upon each other.

The invention is illustrated in the accompanying drawings, as follows:

Figure 1 shows a section on the line 1 1 in Figs. 2 and 3. Fig. 2 shows a section on the line 2 2 in Fig. 1. Fig. 3 shows a section on the line 3 3 in Fig. 1.

A marks the case of the machine, which is preferably of cylindrical shape and has the inlet-spout $a$ and the outlet-spout $a'$. Passing through the center of the case is a shaft B, which is journaled in the boxes B' B' or driven by the pulley B². Mounted upon this shaft are the beaters C and C' in series. As shown, there are two series. The beater C has the blades $c$ with a right pitch, and the beater C' is arranged with the blade $c'$ with a left pitch. The shaft is driven in the direction of the arrow, so that the tendency of the blades upon the beater C is to convey or crowd the grain forward, (toward the right in Fig. 1.) The grain reaching the beater C', which has a tendency to convey or crowd the grain in the opposite direction, retards the forward movement of the grain. The beater C has a greater number of blades or a greater propelling force than the beater C', so that notwithstanding the fact that the grain is retarded by the beater C' the grain is crowded through the beater C' by reason of the greater propelling force of the beater C. In this operation the blades of the beater crowd against the kernels of grain and the kernels of grain crowd against each other, so that they are thoroughly scoured. Any number of series of beaters may be arranged, as desired.

In order that the grain may not take up the rotary motion of the beaters, the retarding-blades A' are arranged in the case between the right and left beaters. These allow a perfectly-longitudinal movement of the grain, but prevent its rotary motion.

It will be noted that the beaters C and C' form whirls of blades about the central shaft and that the blades of the beater C may be termed "conveyer-blades" in that they crowd the grain forward, and the blades of the beater C' may be termed "retarding-blades" in that they retard this forward movement of the grain. It will also be noted that none of the blades of the beater C rotate in the plane of rotation of any of the blades of the beater C' and that there are no forwardly-acting blades in the whirl forming the retarding-beater, or, in other words, that the blades of the retarding-beater rotate without the plane of rotation of any forwardly-moving or conveyer blade. The effect of this construction is to form a complete wall of grain between the two beaters which is actually subjected to more or less pressure throughout the mass.

What I claim as new is—

1. In a grain-scourer, the combination with the case having an inlet and an outlet; means comprising a conveyer-blade for forcing the grain through said case; and a retarding device in said case arranged with a space between it and said forcing means sufficient to allow an accumulation of a mass of grain in said space comprising a rotating blade pitched to tend to effect movement in a direction opposite to the general direction of the grain through said case, and arranged to rotate in a plane out of the plane of rotation of any forwardly-actuating blade, said retarding-blade having less conveying power than the forcing-blade.

2. In a grain-scourer, the combination with the case having an inlet and an outlet; means comprising a conveyer-blade for forcing the grain through said case; and a retarding device comprising a whirl of rotating blades pitched to tend to effect a movement of the grain in the direction opposite to the general movement of the grain through said case, and arranged to rotate in a plane out of the plane of rotation of any forwardly-actuating blade, said retarding device being arranged with a sufficient space between it and said forcing means to allow an accumulation of a mass of grain in said space, and with its blades of less conveying power than the forcing means.

3. In a grain-scourer, the combination of a case having an inlet and an outlet; means for forcing grain forwardly through said case comprising a whirl of rotating blades pitched to effect said forward movement; and a retarding device in said case comprising a rotating blade pitched to tend to effect movement in a direction opposite to the general direction of the grain through said case, and arranged to rotate in a plane out of the plane of rotation of any forwardly-actuating blade, said retarding device being arranged with a sufficient space between it and said forcing means to allow an accumulation of a mass of grain in said space, and with its blades of less conveying power than the forcing means.

4. In a grain-scourer, the combination with the case having an inlet and an outlet; means comprising a conveyer-blade for forcing the grain through said case; a retarding device arranged in said case with longitudinal space between it and said forcing means, said device comprising a rotating blade pitched to tend to effect movement in a direction opposite to the general direction of the grain through said case and arranged to rotate in a plane out of the plane of rotation of any forwardly-actuating blade; and a longitudinal blade, A', arranged in the space between said forwardly-actuating means and said retarding device.

5. In a grain-scourer, the combination with the case, A, having an inlet, a, and outlet, a'; the shaft, B, arranged in said case; a conveying-beater, C', comprising a whirl of blades, c; a retarding-beater, C', comprising a whirl of blades, c', all of which rotate in a plane out of the plane of rotation of any forwardly-actuating blade, said retarding device being arranged at some distance from the conveyer C to allow the accumulation of a mass of grain between the conveyer C and said retarding device, the blades of said retarding device having less conveying power than the blades of the conveying device, C.

6. In a grain-scourer, the combination with the case, A, having an inlet, a, and outlet, a'; the shaft, B, arranged in said case; a conveying-beater, C, comprising a whirl of blades, c; a retarding-beater, C', comprising a whirl of blades, c', all of which rotate in a plane out of the plane of rotation of any forwardly-actuating blade, said retarding device being arranged at some distance from the conveyer, C, the blades of said retarding device having less conveying power than the blades of the conveying device, C; and the longitudinal blades, A', arranged in the space between the conveyer, C, and the retarding device, C'.

In testimony whereof I affix my signature in presence of two witnesses.

FREDERICK A. McLELLAN.

Witnesses:
R. W. FLOURNOY,
J. A. REXROAD.